(12) United States Patent
Doron et al.

(10) Patent No.: US 10,891,163 B2
(45) Date of Patent: *Jan. 12, 2021

(54) ATTRIBUTE DRIVEN MEMORY ALLOCATION

(71) Applicant: INTERNATIONAL BUSINESS MACHINES CORPORATION, Armonk, NY (US)

(72) Inventors: Shai Doron, Kibuz Meggido (IL); Wesam Saleem Ibraheem, Massade (IL); Hernan Theiler, Haifa (IL); Vitali Sokhin, Haifa (IL); Hagai Hadad, Kibuts Gaaton (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/370,168

(22) Filed: Mar. 29, 2019

(65) Prior Publication Data
US 2019/0227846 A1 Jul. 25, 2019

Related U.S. Application Data

(63) Continuation of application No. 15/619,681, filed on Jun. 12, 2017, now Pat. No. 10,282,232.

(51) Int. Cl.
*G06F 9/50* (2006.01)
*G06F 16/22* (2019.01)
(Continued)

(52) U.S. Cl.
CPC ........ *G06F 9/5016* (2013.01); *G06F 12/1009* (2013.01); *G06F 16/22* (2019.01); *G06F 12/023* (2013.01); *G06F 2212/652* (2013.01)

(58) Field of Classification Search
CPC ................. G06F 12/023; G06F 9/5016; G06F 17/30312; G06F 12/1009; G06F 16/22; G06F 2212/652
(Continued)

(56) References Cited

U.S. PATENT DOCUMENTS 6,915,248 B1 7/2005 Ip
7,788,610 B2 8/2010 Emek et al.
(Continued)

FOREIGN PATENT DOCUMENTS

JP 2012118598 A 6/2012

OTHER PUBLICATIONS

IBM: List of IBM Patents or Patent Applications Treated As Related (Appendix P), Feb. 5, 2020, pp. 1-2.
(Continued)

*Primary Examiner* — Hua J Song
(74) *Attorney, Agent, or Firm* — L. Jeffrey Kelly (57) ABSTRACT

A method, computer program product, and computer system for physical memory allocation of a computer system, the method including collecting computer system architecture specifications, a configuration, and user requirements, identifying a plurality of memory intervals to be allocated, based on the computer system architecture specification, the configuration, and the user requirements, grouping memory intervals into a plurality of color groups, wherein each memory interval within each of the plurality of color groups comprise identical memory attributes, dividing memory into sets of memory segments, wherein each set of memory segment is assigned a color of the plurality of color groups, allocating a memory interval of the plurality of memory intervals within the set of memory segments of corresponding color, and selecting a page size for a translation of a memory interval of the plurality of memory intervals,
(Continued)

depending upon the allocation of the memory interval and the sets of memory segments.

15 Claims, 5 Drawing Sheets

(51) Int. Cl.
*G06F 12/1009* (2016.01)
*G06F 12/02* (2006.01)

(58) Field of Classification Search
USPC .......................................................... 711/173
See application file for complete search history.

(56) References Cited

U.S. PATENT DOCUMENTS

| | | |
|---|---|---|
| 7,945,888 B2 | 5/2011 | Adir et al. |
| 8,930,759 B2 | 1/2015 | Katz et al. |
| 2016/0209469 A1 | 7/2016 | Hamid et al. |
| 2016/0210243 A1 | 7/2016 | Fernando |
| 2018/0357101 A1 | 12/2018 | Doron et al. |

OTHER PUBLICATIONS

Deorio, et al., "Dacota: Post-silicon validation of the memory subsystem in multi-core designs", High Performance Computer Architecture, 2009. HPCA 2009. IEEE 15th International Symposium, Feb. 14-18, 2009, Raleigh, NC, pp. 405-416, Print ISBN: 978-1-4244-2932-5, INSPEC Accession No. 10502360, Digital Object Identifier: 10.1109/HPCA.2009.4798278, http://ieeexplore.ieee.org/stamp/stamp.jsp?tp=&arnumber=4798278&isnumber=4798227.

Bolshinski, et al., "The Cartographer Project", The Cartographer, http://www.cs.technion.ac.il/~cs234313/projects_sites/S10/29/site/, printed Apr. 20, 2017, pp. 1-8.

Adir, et al., Threadmill: A Post-Silicon Exerciser for Multi-Threaded Processors, Published in: Design Automation conference (DAC), 2011 48th ACM/EDAC/IEEE, Jun. 5-10, 2011, San Diego, California, USA, Copyright © 2011, pp. 860-865.

Mell et al., "The NIST Definition of Cloud Computing," National Institute of Standards and Technology, Sep. 2011, p. 1-3, Special Publication 800-145.

ATTRIBUTE DRIVEN MEMORY ALLOCATION

BACKGROUND

The present invention relates generally to a method, system, and computer program product for computer aided allocation of physical memory of a computer system, and more particularly to a method, system, and computer program product for allocating physical memory based on required system architecture specifications, system configuration, and user requirements.

A Memory Management Unit, (hereinafter "MMU"), of the computer system, manages access to memory in computer hardware. The MMU performs virtual memory management by translating virtual memory addresses to physical addresses in computer system memory. The MMU may also be referred to as a paged memory management unit, (hereinafter "PPMU"). The MMU may be part of a Central Processing Unit, (hereinafter "CPU"), or alternatively may be a separate integrated circuit. Additional functions performed by the MMU include managing functional attributes of the memory, such as bus arbitration, memory protection, cache control, and bank switching in some computer architectures, such as 8-bit systems.

The MMU typically divides a virtual address space, which is a range of addresses used by the processor, into pages. A basic unit for memory translation is called a page. The attributes of a physical page in memory are specified within the translation resources of a page, such that each address within a page comprises identical attributes. Example of page sizes include 4 kilobyte, (hereinafter "kB"), 16 kB, 64 kb, 2 megabyte, (hereinafter "MB"), 32 MB, 512 MB, and 1 gigabyte. Upper address bits of a virtual address comprise a virtual page number, while a bottom bit of the virtual address corresponds to an offset within a page.

An MMU may use a page table containing one page table entry, (hereinafter "PTE") per page. The page table maps virtual page numbers to main memory physical page numbers. A physical page number is combined with a page offset to give a complete physical address. The PTE may identify information regarding a page, the information may include whether or not the page has been written to, a last assessed date stamp, identification of a processor type which may read and write to the page, for example in supervisor mode or in user mode, and whether the page should be cached. The PTE may prohibit access to a virtual page, for example by directing the MMU to signal a page fault to the CPU. This may occur when there is no physical memory allocated to that virtual page. An operating system, (hereinafter "OS"), may manage the page fault, for example by accessing available physical memory, and creating a new PTE to map the available physical memory to the requested virtual address. If there is no available physical memory, the OS may select an existing page, use a replacement algorithm, and save the existing page to a disk (a process called "paging"). A shortage of PTEs, may result in the OS having to free memory for new mapping. Physical memory may include a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any other method of storing computer code. Memory types may include the physical memory examples listed above.

The MMU may generate an illegal access error condition or an invalid page fault condition upon illegal or non-existing memory accesses, respectively, which may lead to an exception fault or a bus error condition, when handled by the operating system.

An exerciser tool, or an exerciser, may be used in a post-silicon validation or verification cycle as part of a manufacturing process of Integrated Circuits, (hereinafter "IC"). Post-silicon verification confirms functionality of actual devices running in real time using tools such as a logic analyzer and other assertion based tools. An exerciser is an application that is loaded onto a Device or Design Under Test (DUT), and may generate a test program, alternatively called a test case or test template, execute the test program, and check a result of the test program. Exercisers are essential tools in functional verification of a post-silicon platform. An exerciser is an application or program loaded to the computer system, which continuously generates test-cases, executes the test cases, and checks results of the test cases. A stimuli generator is a subcomponent of the exerciser used to generate a test case. As part of test case generation, the stimuli generator allocates one or more intervals in physical memory to be used for testing, and generates virtual translations for each of the one or more intervals.

In a post-silicon test environment, an amount of physical memory available to use for testing may be limited. For example, at an early stage of post-silicon testing, memory devices that are external to a processor may not be available and the processor is required to run the post-silicon testing from its own memory cache. Allocation of intervals in memory is limited when a test case requires many intervals of memory, each with different attributes. For later verification stages, the exerciser may use memory which is external to the processor. It is important that a test case includes memory translations with a variety of page sizes. It is typically desired that certain intervals are translated with large pages in order to control data flow of specific translation micro-architecture resources. For extensive verification it is also desired that an allocation of intervals covers all the physical memory.

Each interval has specific memory attributes. Hence, translating intervals with large pages imposes constraints for allocation of the intervals, since memory attributes are consistent across all pages within the interval, where pages of different sizes can overlap each other in the physical memory domain.

SUMMARY

Embodiments of the present invention disclose a method, computer program product, and computer system for physical memory allocation of a computer system, the method including collecting a plurality of computer system architecture specifications, a computer system configuration, and a plurality of user requirements, identifying a plurality of memory intervals to be allocated, based on the collected computer system architecture specification, the collected computer system configuration, and the collected plurality of user requirements, grouping memory intervals into a plurality of color groups, wherein each memory interval within each of the plurality of color groups comprise identical memory attributes, dividing memory into sets of memory segments, wherein each set of memory segment is assigned a color of the plurality of color groups, allocating a memory interval of the plurality of memory intervals within the set of memory segments of corresponding color, and selecting a page size for a translation of a memory interval of the plurality of memory intervals, depending upon the allocation of the memory interval and the sets of memory segments.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

The present invention generally relates to allocating physical memory based on required memory attributes. One way to allocate physical memory based on required memory attributes is to collect specifics of memory attributes, computer system configuration, and computer system architecture specifications, perform a coloring stage and an allocation stage. An embodiment by which to collect specifics of computer system architecture specifications, configuration and user requirements, perform a coloring stage and an allocation stage is described in detail below by referring to the accompanying drawings in FIGS. 1 to 5. Those skilled in the art will readily appreciate that the detailed description given herein with respect to these figures is for explanatory purposes as the invention extends beyond these limited embodiments.

Figure 1:
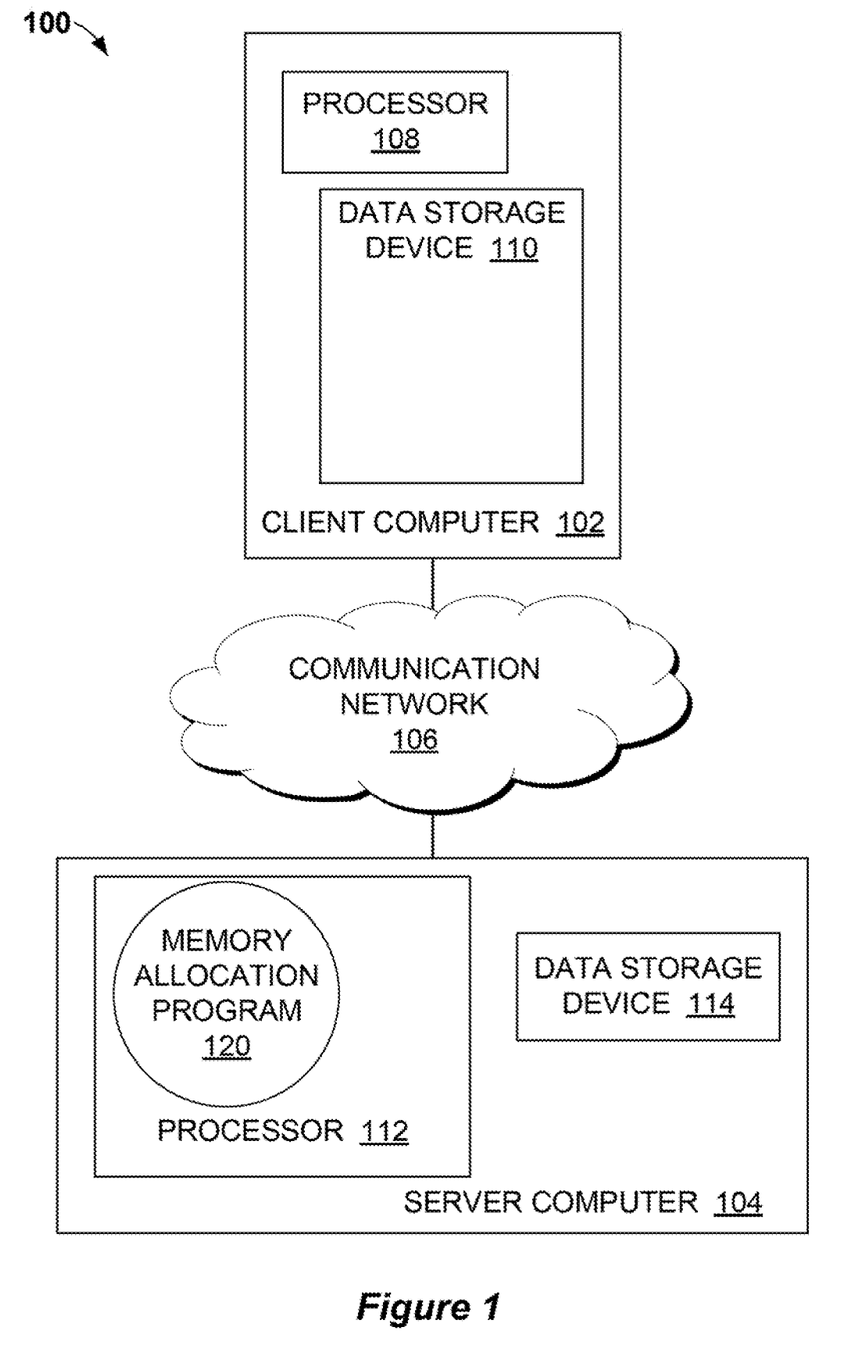
FIG. 1 is a functional block diagram illustrating a distributed data processing environment, in accordance with an embodiment of the present invention.

Referring now to FIG. 1, a functional block diagram illustrating a system 100 in a networked computer environment, in accordance with an embodiment of the present invention, is shown. The system 100 may include a client computer 102 and a server computer 104. The client computer 102 may communicate with the server computer 104 via a communications network 106 (hereinafter "network"). The client computer 102 may include a processor 108, a data storage device 110, and is enabled to interface with a user and communicate with the server computer 104. The server computer 104 may also include a processor 112 and a data storage device 114 that is enabled to a run memory allocation program 120. In an embodiment, the client computer 102 may operate as an input device including a user interface while the memory allocation program 120 may run primarily on the server computer 104. In an alternative embodiment, the memory allocation program 120 may run primarily on the client computer 102 while the server computer 104 may be used for processing a storage of data used by the memory allocation program 120.

It should be noted, however, that processing for the memory allocation program 120 may, in some instances be shared amongst the client computer 102 and the server computer 104 in any ratio. In another embodiment, the memory allocation program 120 may operate on more than one server computer 104, client computer 102, or some combination of server computers 104 and client computers 102, for example, a plurality of client computers 102 communicating across the network 106 with a single server computer 104.

The network 106 may include wired connections, wireless connections, fiber optic connections, or some combination thereof. In general, the network 106 can be any combination of connections and protocols that will support communications between the client computer 102 and the server computer 104. The network 106 may include various types of networks, such as, for example, a local area network (LAN), a wide area network (WAN) such as the Internet, a telecommunication network, a wireless network, a public switched network and/or a satellite network.

In various embodiments, the client computer 102 and/or the server computer 104 may be, for example, a laptop computer, tablet computer, netbook computer, personal computer (PC), a desktop computer, a personal digital assistant (PDA), a smart phone, a mobile device, or any programmable electronic device capable of communicating with the server computer 104 via the network 106. As described below with reference to FIG. 3, the client computer 102 and the server computer 104 may each include internal and external components. In other embodiments, the server computer 104 may be implemented in a cloud computing environment, for example, cloud computing nodes 510, as described in relation to FIGS. 5 and 6 below. Similarly, the client computer 102 may be implemented in the cloud computing environment, for example, laptop computer 540C as shown in FIG. 4.

In an embodiment, the system 100 may include any number of client computers 102 and/or server computers 104; however only one of each is shown for illustrative purposes only. It may be appreciated that FIG. 1 provides only an illustration of an implementation and does not imply any limitations with regard to the environments in which different embodiments may be implemented. Many modifications to the depicted environments may be made based on design and implementation requirements.

The system 100 may be generally configured to perform actions to allocate physical memory based on required memory attributes.

The memory allocation program 120, and associated methods are described and explained in further detail below with reference to FIGS. 2-5.

Figure 2:
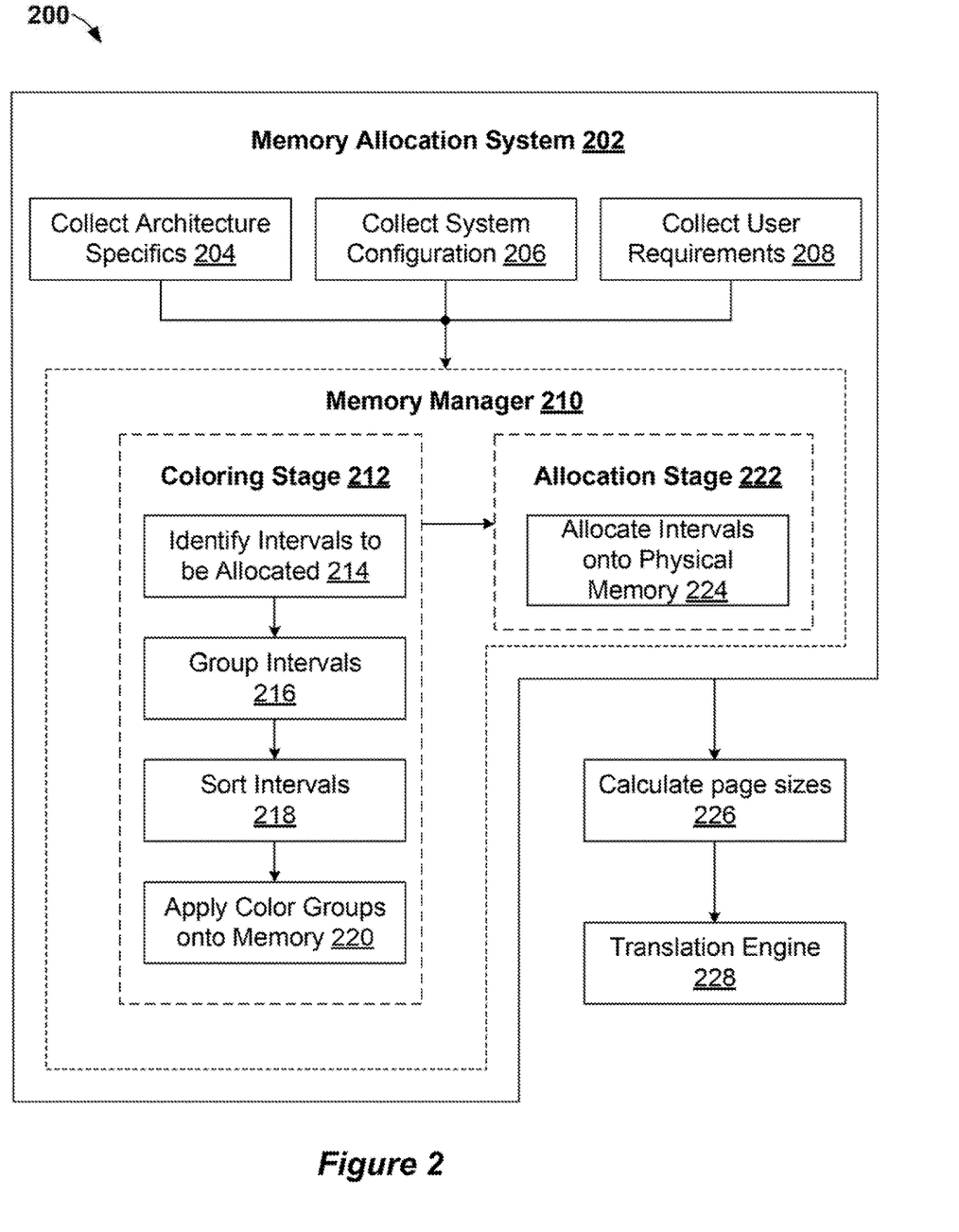
FIG. 2 is a flowchart depicting operational steps of a memory allocation system program within the data processing environment of FIG. 1, in accordance with an embodiment of the present invention.

Referring now to FIG. 2, and with continued reference to FIG. 1, a simplified diagram of a memory allocation system process 200, (hereinafter "process"), illustrating operational steps of the memory allocation program 120, is shown in accordance with an embodiment of the present invention. The memory allocation program 120 may be configured to allocate physical memory based on required memory attributes for each interval of memory, in accordance with an embodiment of the present invention.

An interval of memory may be used for a variety different functions. An interval may be used for common instruction, which is not part of testing. An interval may be used as a helper function code, which may be at beginning addresses or ending addresses of the physical memory. An interval may be used for a test case or test template. In an embodiment, certain large intervals may be translated with large pages in order to reduce a number of translations in a page table. In general there are a variety of page sizes. In an embodiment, for testing purposes, a variety of pages sizes may be used. A user may define the test case for a computer system.

Memory attributes are consistent within a page, and may include whether the memory is read only, execute only, or read/write, identifying whether or not a page is a shared memory, and identifying one or more microprocessors which have access to that page. Additional memory attributes include security indications, such as non-secure memory, different levels of security, such as high security, medium security, and low security. The memory attributes correspond to required attributes of data in the page.

The process 200 includes a memory allocation system 202, calculate page sizes 226, and a translation engine 228. The memory allocation system 202 includes three collecting steps and a memory manager, step 210. The three collecting steps include collect architecture specifications, step 204, collect system configuration, step 206, and collect user requirements, step 208.

Collect architecture specifications, step 204, includes collecting information of the device under test, (hereinafter "DUT"), for example, memory types, page sizes for translating virtual memory to physical memory and memory attributes. Additional information may include a description of test instructions and translation attributes. Examples of memory types include RAM, ROM, and DVD. Example of page sizes include 64 kb, 2 MB, and 512 MB. Memory attributes include whether the memory is read only, execute only, read/write, and security indications.

Collect system configuration, step 206, includes collecting information, such as a post-silicon setup of the computer system, the domain, size and type of the physical memory, a number of microprocessors, connection points of memory, and specifications of which microprocessors may access which memory simultaneously.

Collect user requirements, step 208, includes user requirements extracted from a test template. The test template may describe a test, provide a sequence of instructions, and physical memory intervals to be used. In an embodiment, a test template may describe a test for four processors to execute simultaneous read and write instructions from random addresses within the same intervals in memory.

The memory manager, step 210, includes a coloring stage, step 212, and an allocation stage, step 222. The memory manager, step 210 operates according to input specifications and produces an output of allocation of intervals in physical memory and translation requests passed to calculate page sizes, step 226, and then in turn to Translation Engine, step 228, with the desired page sizes to be used.

The coloring stage, step 212, includes the following steps: identify intervals to be allocated, step 214, group intervals, step 216, sort intervals, step 218, and apply interval groups onto memory, step 220.

Identify intervals to be allocated, step 214, includes collect all intervals resulting from allocation requests specified for the test template by the user. An interval is defined by its attributes, address-mask and size. The address-mask may hold all possible locations for a start address of the interval. Following is an embodiment of a logical definition of step 214.

Group intervals, step 216, includes grouping the intervals with identical attributes together. A grouping of intervals with identical attributes may be referred to as a color group. For each Color Group C, calculate a normalized memory size, $S_c$, shown in an embodiment below.

Define color groups, where each color group consists all intervals of identical attributes.

For each Color Group C, calculate a normalized memory size, Sc, using the following equation, group intervals:

$$S_c = S_m \frac{\sum_{i \in c} S_i}{\sum_{i=1}^{n} S_i}$$

where:
$S_m$: the size of total physical memory
$S_i$: the size of an interval i
n: a total number of intervals Sort intervals, step 218, includes sorting the color groups by memory size. Sorting the color groups by memory size may include listing the color group with the largest memory size first. For each interval i, calculate a weighted score, $W_i$, as described in an embodiment below. Sort all intervals according to their weighted score, $W_i$, in descending order, as described below. The weighted score, $W_i$, provides a metric for a restrictiveness of allocating intervals in memory. A relatively higher weighted score, $W_i$, indicates the interval i has fewer possible start addresses in memory and the interval i requires a large consecutive memory space to accommodate the size of the interval i. Thus, the interval i has a more restrictive allocation request.

For each interval i, calculate a weighted score $W_i$, using the following equation, as part of step 218, sort intervals, described above:

$$W_i = (B_i + 1) * \log_2 S_i$$

where:
$B_i$: a number of fixed bits in an address mask of the interval i
$S_i$: the size of an interval i List all intervals according to their weighted score, $W_i$, in descending order Apply color groups onto memory, step 220, is next. Each of the color groups are applied onto the available memory by building color segments and storing intervals of the same color group in close physical proximity, such that any color fragmentation, or separation of intervals with different color groups, of the memory is minimal. This may produce memory coloring, or building color segments which may yield allocation of intervals that is worthy of testing for design verification purposes. More than one color group may be applied onto memory by the memory allocation program 120.

Applying color groups onto memory is further described in the following embodiment. This includes a definition of M, a set of segments representing a total uncolored physical memory, and $M_c$: a set of segments representing the memory segments applied to color group C.

Definitions:
M: a set of segments representing a total uncolored physical memory, or available memory
$M_c$: a set of segments representing the memory segments applied to color group C
minpagesize=a minimum page size for translation, specified in an architecture specification
maxpagesize=a maximum page size for translation, specified in an architecture specification Initially M is equal to a total physical memory, as defined at the collect system configuration, step 206, and $M_c$ is empty. A segment is a consecutive memory region with a certain attribute (e.g., color).

The apply color groups onto memory, step 220, described in an embodiment below, includes finding for all intervals of each Color Group C, a set of segments in memory that can satisfy allocation of intervals of Color Group C. Such set of segments is applied with Color C in step 220. The boundaries of region L', e.g. the start address and the end address of L', are aligned to minPageSize. This mean that both start address and end address are divided by minPageSize without any residue. The embodiment below includes taking any remaining uncolored segments in memory (if any) and for each such segment apply the color of one of the colored segments that is adjacent to this region in memory.

For each interval in the list (descending weighted score, $W_i$):
a. select interval, $R_i$ with a highest weighted score, $W_i$, in list, where interval $R_i \in$ Color Group C
b. If $S_c$=0, then return to step (a) above for next interval i+1 in list.
c. Find a segment, L, in available memory, M, where $L \subset M$, and L can accommodate allocation of interval $R_i$, i.e. $R_i \subset L$. If such a segment does not exist, then return to step (a) above for next interval i+1 in list.
d. size_to_color=minimum {size of (L), $S_c$, maxpagesize}
e. Find a sub-segment $L' \subset L$, such that:
 1. size of (L')=size_to_color
 2. if size of ($R_i$)≤size_to_color then interval $R_i \subset L'$
 3. boundaries of L' are aligned to minpagesize, which means that the start address and the end address of L' are divided by minpagesize with zero residue:

start address of (L') =
 start address of (L') with lower $\log_2$(minpagesize) −
 1 bits set to zeroes
end address of (L') = end address of (L') with lower $\log_2$(minpagesize) −
 1 bits set to ones 4. if size of (Color Group C)=maxpagesize, then boundaries of L' are also aligned to maxpagesize
f. add L' to $M_c$
g. $S_c = S_c$ − size of (L')
h. remove L' from M
i. if $R_i$ is not the last interval in list of sorted intervals, then return to step (a) above for next interval i+1 in list For each remaining segment $L \in M$, apply to L the color C of one of its adjacent segments $L' \in M_c$ by adding L to Mc and removing L from M At a conclusion of applying color groups onto memory, step 220, all color groups have been applied onto memory, M is empty, and $M_c$ contains all the segments that were colored with Color Group C.

The allocation stage, step 222, includes allocating intervals onto physical memory. In this stage the intervals are allocated in the physical memory according to their attributes (color group), and the preliminary coloring segmentation.

Following is an embodiment of a logical definition of the allocation stage, step 222.

Definitions:
M: a set of segments representing the total available physical memory
$M_c$: a set of segments representing memory segments applied to color group C For each interval in the list (descending score order):
a. find interval $R_i$ with highest weighted score, $W_i$, in list. We denote: interval $R_i \in$ color group C
b. find a segment $L \subset M_c$, such that L satisfies an allocation for $R_i$
This means that size of (L)=size of ($R_i$) and startaddress (L) $\in$ startaddress ($R_i$)
c. if such L exists then:
 1. define L to be an actual allocation of $R_i$ in physical memory
 2. remove L from $M_c$
 3. remove L from M
 4. if ($R_i$) is not the last interval in the list, then return to step (a) above for next interval (i+1) in the list.
d. if such L does not exist, then in order to satisfy the allocation of $R_i$ we need to revise the memory coloring:
 1. find a segment $L \subset M$, such that L satisfies an allocation for $R_i$
 2. align boundaries of L according to minpagesize
 3. for any color group j such that $L \cap M_j \neq \emptyset$, remove ($L \cap M_j$) from $M_j$
 4. remove L from M
 5. add L to $M_c$
 6. for Rl∈Ri such that Rl ⊂ L, define Rl to be an actual allocation of $R_i$ in physical memory and remove Rl from $M_c$ 7. if $R_i$ is not the last interval in the list, then return to step (a) above for next interval (i+1) in the list.

The above coloring stage, step 212, and the allocation stage, step 222, are functions of the memory manager, step 210.

Calculate page sizes, step 226, is the next step after the memory manager, step 210. Calculate page sizes, step 226 may include calculating a page size needed for a translation of each interval. A description of calculate page steps, step 226, is described below.

For each interval that is allocated in physical memory it is required to generate a translation from virtual memory to physical memory. The translation of an interval is a sequence of consecutive pages in virtual memory, with mapping to consecutive pages in physical memory such that the pages in physical memory provides mapping to the physical location of the interval. Each interval is translated via at least one page, i.e. one translation in the page table. In a preferred embodiment, intervals are translated with a variety of page sizes. For each interval, all possible page sizes that can be used to translate this interval may be found, such that pages overlap with the interval and are fully contained in the color group of the interval. Overlap refers to overlapping between a page and the translation to the interval.

An embodiment is shown below with reference to Tables 1 and 2. Table 1 shows an example of physical memory pages and a physical memory address range for each page. In this example, each page has an address range of 2,000 kbytes. The physical memory page 1 has the physical memory address range of 00000-01999, the physical memory page 2 has the physical memory address range of 02000-03999, etc. Although this example shows physical memory pages with the same size, an embodiment may apply to physical memory pages of unequal sizes.

TABLE 1

| Physical Memory | Page Physical memory address range |
|---|---|
| 1 | 00000-01999 |
| 2 | 02000-03999 |
| 3 | 04000-05999 |
| 4 | 06000-07999 |
| 5 | 08000-09999 |

Table 2 shows an example of intervals, an assigned color for each interval, a physical address range of each interval, and a corresponding physical memory page of each interval. Interval #1 is assigned a color of red and is in the physical address range of 00100-00600. This physical address range is on the physical memory page 1, per the previous table. As shown in this example, intervals of the same color may be grouped next to each other, and may also have other color intervals between some of the intervals of the same color. This example also demonstrates that within a page, any intervals within that page are the same assigned color, and have the same memory attributes. In this example, interval 2 overlaps pages 1 and 2.

TABLE 2

| Interval # | Color of interval | Physical address range | Physical Memory Page(s) |
|---|---|---|---|
| 1 | red | 00100-00600 | 1 |
| 2 | red | 01200-02400 | 1 and 2 |
| 3 | red | 03000-03400 | 2 |
| 4 | green | 04000-04600 | 3 |
| 5 | green | 04700-05800 | 3 |
| 6 | red | 06000-07000 | 4 |
| 7 | red | 07200-07600 | 4 |
| 8 | blue | 08000-08300 | 5 |
| 9 | blue | 08500-90000 | 5 |

Following is an embodiment of a logical definition of calculate page sizes, step 226.

For each interval $R_i$ find a set of allowed page sizes, $P_{sizes}(R_i)$, that can be used to translate the interval:

Definition:
$P_{sizes}$: a set of all possible page sizes the architecture specifies for translations $P_{pages}(R_i)$ is the set of all possible pages which overlap with interval $R_i$ and are fully contained in the color group $M_c$ of interval $R_i$:
$P_{pages}(R_i)=\{\forall \text{ page } P | (P \cap R_i \neq 0) \wedge (P \subset M_c)\}$
$P_{max}(R_i)$ is the page with maximum size in $P_{pages}(R_i)$
Finally, we get:
$P_{sizes}(R_i)=\{\forall \text{ page size} | (\text{page size} \subseteq P_{sizes}) \wedge (\text{page size} \leq P_{max}(R_i))\}$ The Translation Engine, step 228, builds translations for each of the intervals allocated in physical memory. The translation engine, step 228, generates mapping from virtual memory to the physical memory of the interval. The translations are updated into the page table. The MMU of the computer system may use the page mapping table when running programs, software, applications, test cases, and the like, on the computer system.

The present invention is a dedicated system for allocating intervals in memory such that a domain of the physical memory can be translated with large pages while maintaining consistency of its attributes within the pages. Thus, the colors of the color groups with the same attributes are applied in available memory with minimal memory fragmentation.

Figure 3:
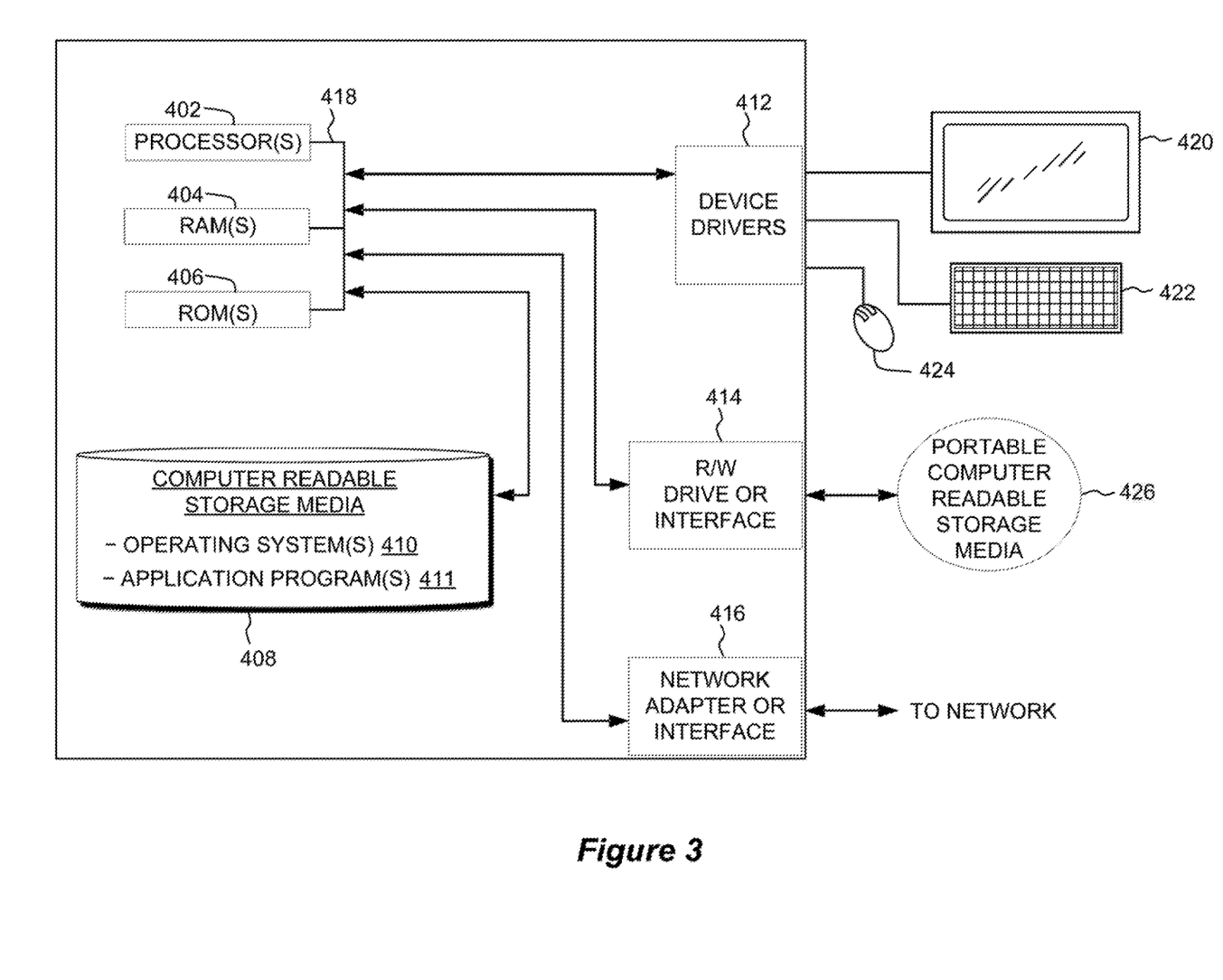
FIG. 3 is a block diagram of internal and external components of computers and servers depicted in FIG. 1, in accordance with an embodiment of the present invention.
Figure 4:
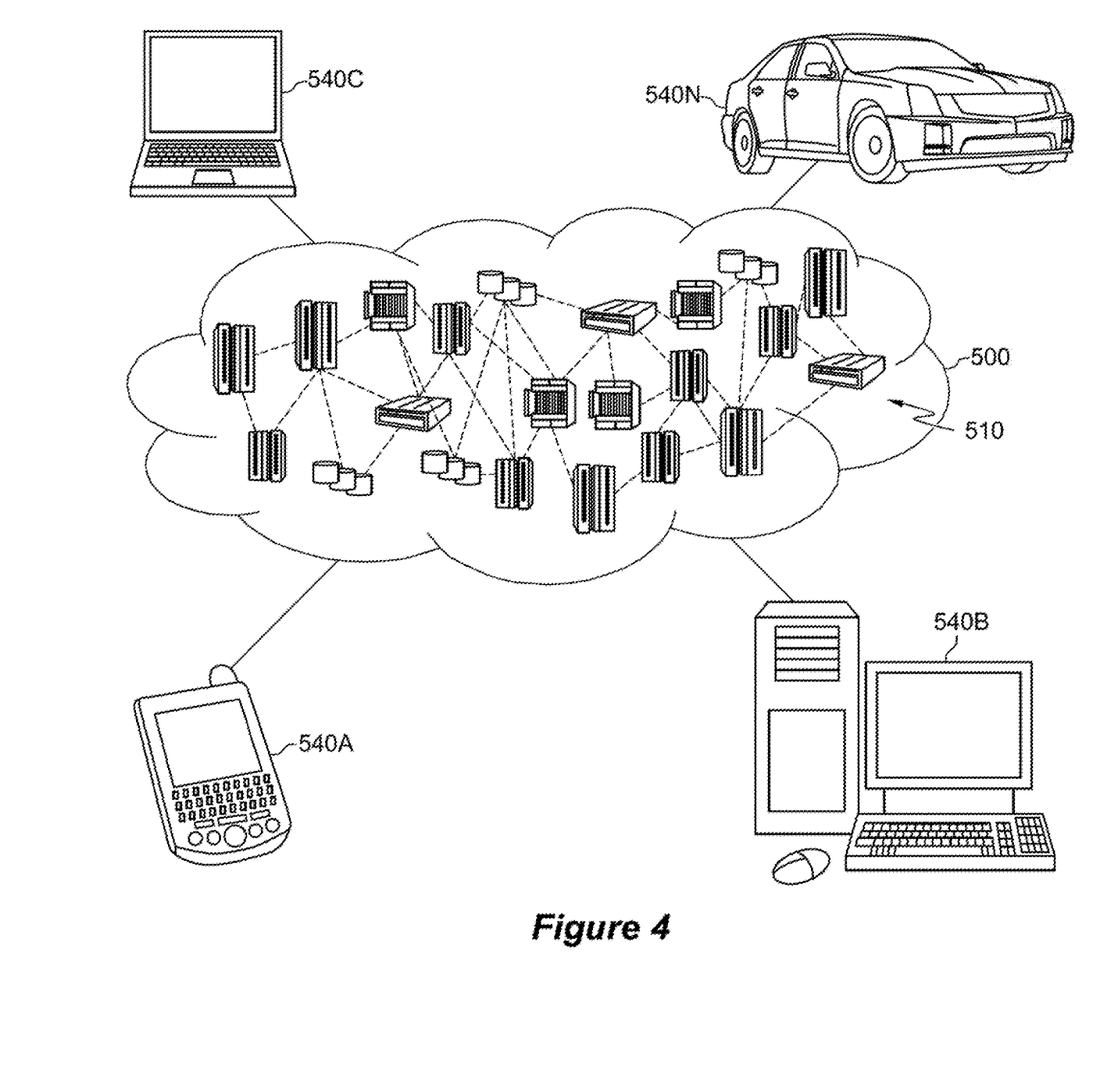
FIG. 4 is a block diagram of functional layers of a cloud computing environment, in accordance with an embodiment of the present disclosure.

Referring now to FIG. 3, a block diagram of components of a computing device, such as the client computer 102 or the server computer 104, of the system 100 of FIG. 1, in accordance with an embodiment of the present invention is shown. It should be appreciated that FIG. 3 provides only an illustration of an implementation and does not imply any limitations with regard to the environments in which different embodiments may be implemented. Many modifications to the depicted environment may be made.

The computing device may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, the memory allocation program 120, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The computing device may also include a R/W drive or interface 414 to read from and write to one or more portable computer readable storage media 426. Application programs 411 on the computing device may be stored on one or more of the portable computer readable storage media 426, read via the respective R/W drive or interface 414 and loaded into the respective computer readable storage media 408.

The computing device may also include the network adapter or interface 416, such as a TCP/IP adapter card or wireless communication adapter (such as a 4G wireless communication adapter using OFDMA technology). Application programs 411 on the computing device may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

The computing device may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics of cloud computing include on-demand self-service, broad network access, resource pooling, rapid elasticity, and measured service, which are each described below.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models include Software as a Service, Platform as a Service, and Infrastructure as a Service, which are each described below.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models include private cloud, community cloud, public cloud, and hybrid cloud, which are each described below.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, cloud computing environment 500 is depicted. As shown, cloud computing environment 500 includes one or more cloud computing nodes 510 with which local computing devices used by cloud consumers, such as, for example, personal digital assistant (PDA) or cellular telephone 540A, desktop computer 540B, laptop computer 540C, and/or automobile computer system 540N may communicate. Cloud computing nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 54A-N shown in FIG. 4 are intended to be illustrative only and that cloud computing nodes 510 and cloud computing environment 500 can communicate with any type of computerized device over any type of network and/or network addressable connection (e.g., using a web browser).

Figure 5:
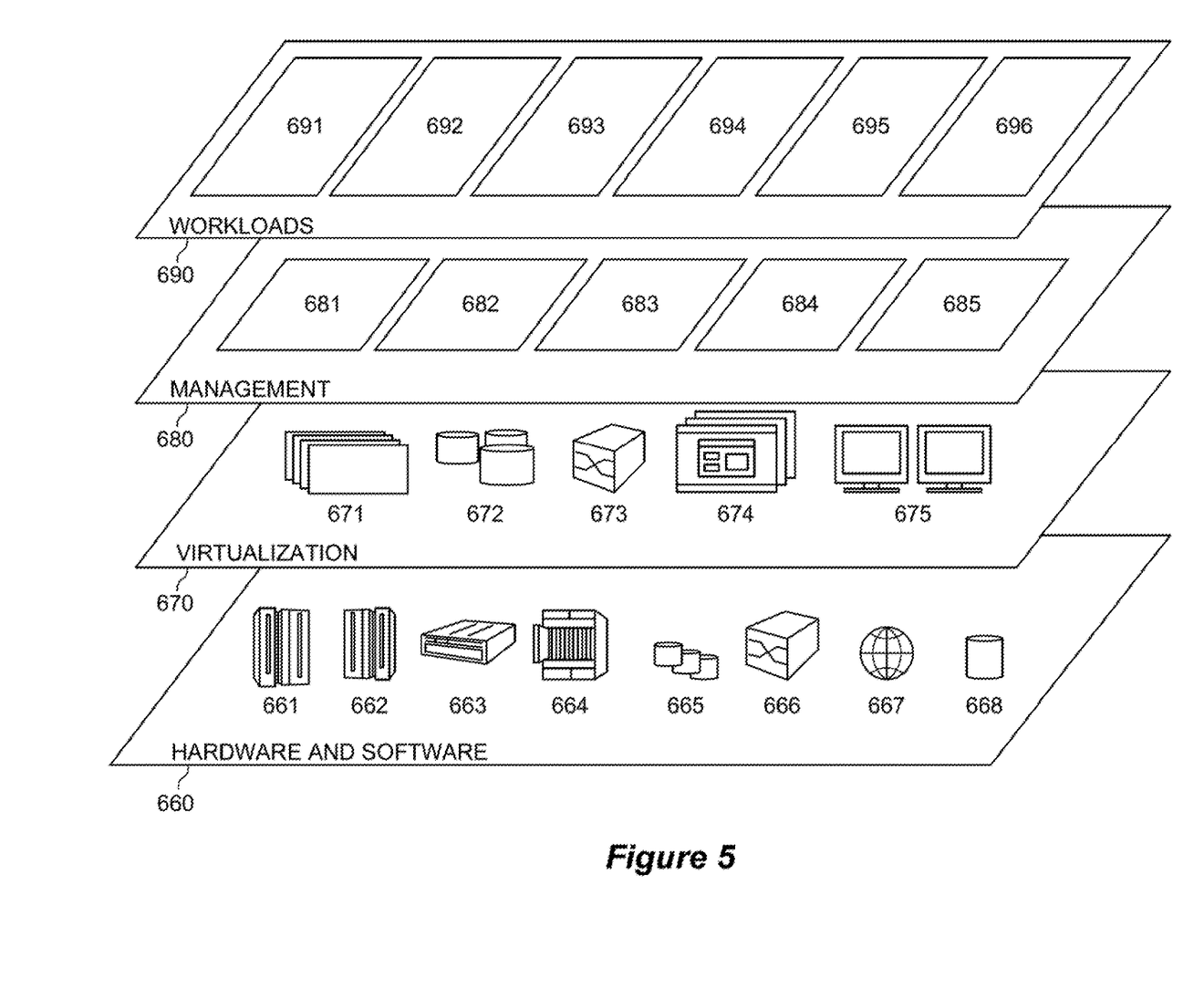
FIG. 5 is a functional block diagram of functional layers of the cloud computing environment of FIG. 4, in accordance with an embodiment of the present invention.

Referring now to FIG. 5, a set of functional abstraction layers provided by cloud computing environment 500 (as shown in FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672, for example the data storage device 114 as shown in FIG. 1; virtual networks 673, including virtual private networks; virtual applications and operating systems 674; and virtual clients 675.

In an example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In an example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and memory allocation 696. Memory allocation s 696 may include allocating memory based on attributes of a computer system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for memory allocation of a computer system, the method comprising:

collecting a plurality of computer system architecture specifications, a computer system configuration, and a plurality of user requirements;

identifying a plurality of memory intervals to be allocated, based on the collected plurality of computer system architecture specifications, the collected computer system configuration, and the collected plurality of user requirements;

grouping the identified plurality of memory intervals into a plurality of color groups, wherein each memory interval within each of the plurality of color groups comprises a plurality of identical memory attributes;

dividing memory into sets of memory segments, wherein each set of memory segments is assigned a color of the plurality of color groups, wherein dividing memory into sets of memory segments comprises calculating a weighed score for each memory interval within the plurality of memory intervals, sorting each memory interval within the identified plurality of memory intervals, by decreasing weighed score and dividing the memory into sets of memory segments, depending on the memory interval sorting, wherein a size of each memory segment of the set of memory segments is smaller than a maximum page size of the memory;

allocating a memory interval of the identified plurality of memory intervals within the set of memory segments of the corresponding color; and  selecting a page size for a translation of the memory interval of the plurality of memory intervals, depending upon the allocation of the memory interval and the sets of memory segments.

2. The method according to claim 1, wherein the computer system configuration comprises:
- a post-silicon setup;
- identification of one or more memory units,
- identification of at least one attribute of each of the one or more memory units;
- identification of one or more microprocessors;
- identification of a plurality of connection points between the one or more memory units and the one or more microprocessors; and
- specification of a first set of the one or more microprocessors which are permitted to access memory simultaneously.

3. The method according to claim 1, wherein the user requirements comprises:
- a test, wherein the test comprises a sequence of instructions and identification of a plurality of memory intervals.

4. The method according to claim 1, wherein selecting a page size for a translation of a memory interval further comprises:
- selecting a size of a page in memory which overlaps with the memory interval, wherein the page in memory is fully contained in the corresponding memory segments of the set of memory segments of the same color.

5. The method according to claim 1, wherein allocating a memory interval of the plurality of memory intervals within the set of memory segments of corresponding color further comprises:
- minimizing memory fragmentation within each of the sets of memory segments.

6. A computer program product for memory allocation system of a computer system, the computer program product comprising:
- one or more computer-readable storage media and program instructions stored on the one or more computer-readable storage media, the program instructions executed by a computer, the program instructions comprising:
- program instructions to collect a plurality of computer system architecture specifications, a computer system configuration, and a plurality of user requirements;
- program instructions to identify a plurality of memory intervals to be allocated, based on the collected plurality of computer system architecture specifications, the collected computer system configuration and the collected plurality of user requirements;
- program instructions to group the identified plurality of memory intervals into a plurality of color groups, wherein each memory interval within each of the plurality of color groups comprises a plurality of identical memory attributes;
- program instructions to divide memory into sets of memory segments, wherein each set of memory segments is assigned a color of the plurality of color groups, wherein program instructions to divide memory into sets of memory segments comprises program instructions to calculate a weighed score for each memory interval within the plurality of memory intervals, program instructions to sort each memory interval within the identified plurality of memory intervals, by decreasing weighed score and program instructions to divide the memory into sets of memory segments, depending on the memory interval sorting, wherein a size of each memory segment of the set of memory segments is smaller than a maximum page size of the memory;
- program instructions to allocate a memory interval of the identified plurality of memory intervals within the set of memory segments of the corresponding color; and
- program instructions to select a page size for a translation of the memory interval of the plurality of memory intervals, depending upon the allocation of the memory interval and the sets of memory segments.

7. The computer program product according to claim 6, wherein the computer system configuration comprises:
- a post-silicon setup;
- identification of one or more memory units,
- identification of at least one attribute of each of the one or more memory units;
- identification of one or more microprocessors;
- identification of a plurality of connection points between the one or more memory units and the one or more microprocessors; and
- specification of a first set of the one or more microprocessors which are permitted to access memory simultaneously.

8. The computer program product according to claim 6, wherein the user requirements comprises:
- a test, wherein the test comprises a sequence of instructions and identification of a plurality of memory intervals.

9. The computer program product according to claim 6, wherein program instructions to select a page size for a translation of a memory interval further comprises:
- program instructions to select a size of a page in memory which overlaps with the memory interval, wherein the page in memory is fully contained in the corresponding memory segments of the set of memory segments of the same color.

10. The computer program product according to claim 6, wherein program instructions to allocate a memory interval of the plurality of memory intervals within the set of memory segments of corresponding color further comprises:
- program instructions to minimize memory fragmentation within each of the sets of memory segments.

11. A computer system for memory allocation system of a computer system, the computer system comprising:
- one or more computer processors, one or more computer-readable storage media, and program instructions stored on the one or more computer-readable storage media for execution by at least one of the one or more processors, the program instructions comprising:
- program instructions to collect a plurality of computer system architecture specifications, a computer system configuration, and a plurality of user requirements;
- program instructions to identify a plurality of memory intervals to be allocated, based on the collected plurality of computer system architecture specifications, the collected computer system configuration and the collected plurality of user requirements;
- program instructions to group the identified plurality of memory intervals into a plurality of color groups, wherein each memory interval within each of the plurality of color groups comprises a plurality of identical memory attributes;
- program instructions to divide memory into sets of memory segments, wherein each set of memory segments is assigned a color of the plurality of color groups, wherein program instructions to divide memory into sets of memory segments comprises program instructions to calculate a weighed score for each memory interval within the plurality of memory intervals, program instructions to sort each memory interval within the identified plurality of memory intervals, by decreasing weighed score and program instructions to divide the memory into sets of memory segments, depending on the memory interval sorting, wherein a size of each memory segment of the set of memory segments is smaller than a maximum page size of the memory;

program instructions to allocate a memory interval of the plurality of memory intervals within the set of memory segments of the corresponding color; and program instructions to select a page size for a translation of the memory interval of the plurality of memory intervals, depending upon the allocation of the memory interval and the sets of memory segments.

12. The computer system according to claim 11, wherein the computer system configuration comprises:
   a post-silicon setup;
   identification of one or more memory units,
   identification of at least one attribute of each of the one or more memory units;
   identification of one or more microprocessors;
   identification of a plurality of connection points between the one or more memory units and the one or more microprocessors; and
   specification of a first set of the one or more microprocessors which are permitted to access memory simultaneously.

13. The computer system according to claim 11, wherein the user requirements comprises:
   a test, wherein the test comprises a sequence of instructions and identification of a plurality of memory intervals.

14. The computer system according to claim 11, wherein program instructions to select a page size for a translation of a memory interval further comprises:
   program instructions to select a size of a page in memory which overlaps with the memory interval, wherein the page in memory is fully contained in the corresponding memory segments of the set of memory segments of the same color.

15. The computer system according to claim 11, wherein program instructions to allocate a memory interval of the plurality of memory intervals within the set of memory segments of corresponding color further comprises:
   program instructions to minimize memory fragmentation within each of the sets of memory segments.

* * * * *